United States Patent
Loprieno et al.

(10) Patent No.: US 11,258,537 B2
(45) Date of Patent: *Feb. 22, 2022

(54) METHOD, APPARATUS AND SYSTEM FOR ERROR CONTROL

(71) Applicant: Cisco Technology, Inc., San Jose, CA (US)

(72) Inventors: Gilberto Loprieno, Milan (IT); Stefan Langenbach, Lauf a.d. Pegnitz (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,083

(22) Filed: Nov. 23, 2020

(65) Prior Publication Data

US 2021/0075543 A1    Mar. 11, 2021

Related U.S. Application Data

(63) Continuation of application No. 16/663,833, filed on Oct. 25, 2019, now Pat. No. 10,887,052.

(30) Foreign Application Priority Data

Oct. 25, 2018  (GB) ...................... 1817374

(51) Int. Cl.
| | |
|---|---|
| *H04B 10/69* | (2013.01) |
| *H04L 1/00* | (2006.01) |
| *H04B 10/50* | (2013.01) |
| *H04B 10/66* | (2013.01) |

(52) U.S. Cl.
CPC .......... *H04L 1/0061* (2013.01); *H04B 10/50* (2013.01); *H04B 10/66* (2013.01); *H04L 1/0047* (2013.01)

(58) Field of Classification Search
CPC ........................................... H04B 10/60–6973
See application file for complete search history.

(56) References Cited

U.S. PATENT DOCUMENTS

| | | | |
|---|---|---|---|
| 10,887,052 B2* | 1/2021 | Loprieno | H04L 1/0052 |
| 2002/0080802 A1 | 6/2002 | Sachs et al. | |
| 2003/0065993 A1 | 4/2003 | Kaji | |
| 2008/0267622 A1* | 10/2008 | Loprieno | H04L 1/203 398/27 |
| 2014/0215292 A1* | 7/2014 | Luby | H04L 1/0057 714/776 |

(Continued)

OTHER PUBLICATIONS

Combined Search and Examination Report in counterpart GB Application No. 1817374.0, dated Feb. 28, 2019, 5 pages.

*Primary Examiner* — Nathan M Cors

(57) ABSTRACT

A first device receives a first container frame having a payload of a first length. The payload of the container frame includes multiple optical transport unit (OTU) frames, each of which includes an optical data unit (ODU) frame and a sequence of forward error correction (FEC) bits for the ODU frame. Each OTU frame is associated with a first sequence of error-identifying bits. The first device determines, for each OTU frame, a second sequence of error-identifying bits, and forms a second container frame including the OTU frames, the first sequences of error-identifying bits, and the second sequences of error-identifying bits. The first device transmits the second container frame to a second device.

20 Claims, 11 Drawing Sheets

(56) References Cited

U.S. PATENT DOCUMENTS

2016/0142179 A1\* 5/2016 Fludger .................. H04J 14/06
 398/65
2016/0156413 A1\* 6/2016 Fu ....................... H04J 14/0256
 398/58
2016/0285547 A1 9/2016 Loprieno et al.

\* cited by examiner

S210 – Receive, over a communications link, a container frame having a payload comprising: a plurality of OTU frames each comprising an ODU frame and a sequence of FEC bits for the ODU frame; and a plurality of sequences of error-identifying bits, each sequence being for a respective one of the OTU frames

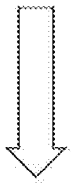

•S220 – Determine, based on the plurality of sequences of error-identifying bits, a performance of the communications link

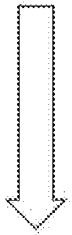

•S230 – Transmit the container frame to a third device

FIG. 6

S310 – Receive, over a communications link, a container frame comprising: a plurality of OTU frames, each comprising an ODU frame and a sequence of FEC bits for the ODU frame; and a plurality of first sequences of error-identifying bits, each first sequence being for a respective one of the OTU frames

• S320 – Determine, for each of the plurality of OTU frames, a second sequence of error-identifying bits

• S330 – Form a second container frame comprising the plurality of OTU frames, the plurality of first sequences of error-identifying bits, and the plurality of second sequences of error-identifying bits

• S340 – Determine, based on the plurality of first sequences of error-identifying bits, a performance of the communications link

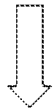

• S350 – Transmit the second container frame to a fourth device

FIG. 7

S410 – Receive, over a communications link, a container frame comprising: a plurality of OTU frames each comprising an ODU frame and a sequence of FEC bits for the ODU frame; a plurality of first sequences of error-identifying bits, each of the first sequences being for a respective one of the OTU frames; and a plurality of second sequences of error-identifying bits, each of the second sequences being for a respective one of the OTU frames

•S420 – Determine, based on the plurality of first sequences of error-identifying bits, a performance of the communications link

•S430 – Determine, based on the plurality of second sequences of error-identifying bits, a performance of a second communications link over which the container frame has travelled

•S440 – Decode the sequences of FEC bits

•S450 – Determine, based on the decoding, a performance of an aggregated communications link over which the container frame has travelled, the aggregated communications link comprising the first and second communications links and a third communications link

FIG. 8

METHOD, APPARATUS AND SYSTEM FOR ERROR CONTROL

PRIORITY CLAIM

This application is a continuation of U.S. patent application Ser. No. 16/663,833, filed Oct. 25, 2019, which claims priority to United Kingdom Patent Application No. 1817374.0, filed Oct. 25, 2018, the entirety of which is incorporated herein by reference.

TECHNICAL FIELD

The present disclosure relates generally to a method, apparatus and a system for error control. In particular, but without loss of generality, the present disclosure relates to methods, apparatuses and a system for error control in an optical communication system.

BACKGROUND

In telecommunication systems, error detection and correction—or error control—techniques may be used when transmitting data over unreliable communication links. These communication links may be particularly prone to errors when data is transmitted at high data rates, and/or over long distances.

One technique for controlling errors in such situations is forward error correction (FEC). FEC involves encoding data to be transmitted in a redundant way, thereby allowing a receiver to detect and correct a limited number of errors that have occurred during transmission.

BRIEF DESCRIPTION OF THE DRAWINGS

Examples of the present disclosure will now be explained with reference to the accompanying drawings in which:

FIG. 6 is a flowchart illustrating steps of a second method described herein for use with a first optical module;

FIG. 7 is a flowchart illustrating steps of a third method described herein for use with a second optical module;

FIG. 8 is a flowchart illustrating steps of a fourth method described herein for use with a second framer device.

Throughout the description and the drawings, like reference numerals refer to like parts.

DESCRIPTION OF EXAMPLE EMBODIMENTS

Overview

A number of methods of error control are described herein.

A first method is performed at a first device and comprises receiving a plurality of optical transport unit (OTU) frames having a first length, each of the OTU frames comprising an optical data unit (ODU) frame, and a sequence of forward error correction (FEC) bits for the ODU frame. The method also includes determining, for each of the plurality of OTU frames, a sequence of error-identifying bits, thereby determining a plurality of sequences of error-identifying bits. The method further includes forming a container frame having a payload of a second length, the payload comprising the plurality of OTU frames and the plurality of sequences of error-identifying bits, wherein the second length is not a multiple of the first length. The method also includes transmitting the container frame to a second device over a first communications link.

A second method is performed at a second device and comprises receiving, over a first communications link, a container frame having a payload of a first length. The payload comprises a plurality of OTU frames having a second length and a plurality of sequences of error-identifying bits, each sequence being for a respective one of the OTU frames. Each OTU frame comprises an ODU frame and a sequence of FEC bits for the ODU frame. The first length of the payload of the container frame is not a multiple of the second length of each OTU frame. The method also includes determining, based on the plurality of sequences of error-identifying bits, a performance of the first communications link.

A third method is performed at a third device and comprises receiving, over a first communications link, a container frame having a payload of a first length. The container frame comprises a plurality of OTU frames having a second length and a plurality of first sequences of error-identifying bits, each first sequence being for a respective one of the OTU frames. Each OTU frame comprises an ODU frame and a sequence of FEC bits for the ODU frame. The first length of the payload of the container frame is not a multiple of the second length of each OTU frame. The method also includes determining, for each of the plurality of OTU frames, a second sequence of error-identifying bits, thereby determining a plurality of second sequences of error-identifying bits. The method further includes forming a second container frame comprising the plurality of OTU frames, the plurality of first sequences of error-identifying bits, and the plurality of second sequences of error-identifying bits. The method also includes transmitting the second container frame to a fourth device.

Example Embodiments

Figure 1:
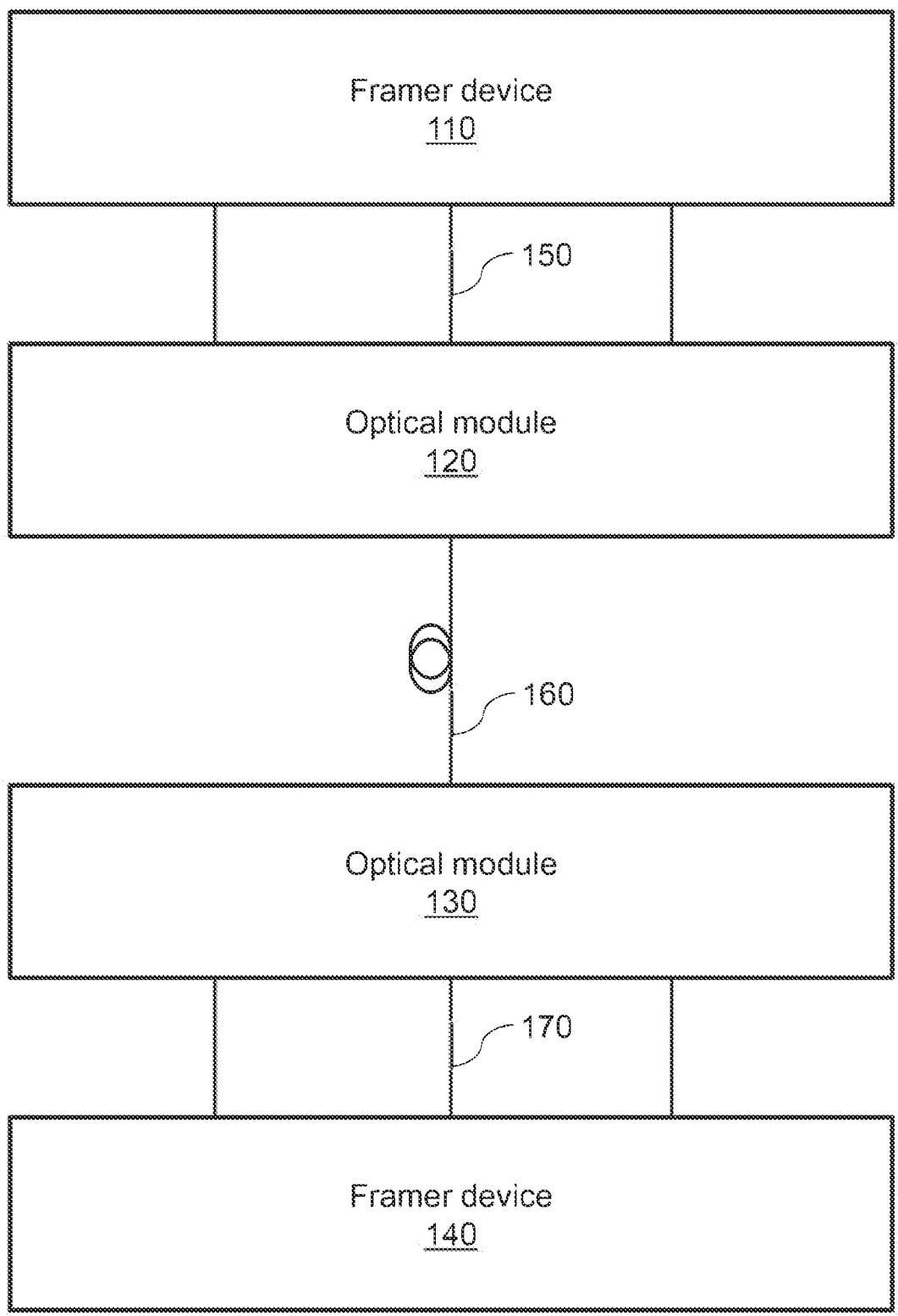
FIG. 1 is a block diagram of a system for implementing the methods described herein.

FIG. 1 is a block diagram of an optical communication system for implementing the methods described herein. A first framer device 110 (or 'chip', or 'framer', or 'universal PHY', or 'universal PHY device') is arranged to transmit data to a first optical module 120 (or 'optical transceiver', or 'pluggable', or 'module', or 'DSP') via one or more first communication links 150.

A framer device is a device that is operable to analyse and process optical transport network (OTN) frames, extract overhead bytes contained in the OTN frames, and/or determine or calculate errors that have been introduced in the OTN frames.

An optical module is an optical transceiver having an electrical interface coupled to another electronic device (e.g., a framer device), and an optical interface coupled to an optical medium. An optical module may have a form factor that allows it to be easily plugged into, and removed from, the electronic device to which it is coupled via the electrical interface.

The first optical module 120 is in turn arranged to transmit data to a second optical module 130 via one or more second communication links 160. The second optical module 130 is in turn arranged to transmit data to a second framer device 140 via one or more third communication links 170.

Although data can of course be transmitted in the opposite direction (i.e., from the second framer device 140 to the first framer device 110, via the second and first optical modules 130, 120), in a scenario where data is being transmitted from the first framer device 110 to the second framer device 140, the first framer device 110 and first optical module 120 may be referred to as being at the 'near-end', while the second optical module 130 and second framer device 140 may be referred to as being at the 'far-end'.

The one or more first communication links 150 are electrical links, such as traces on a backplane of a line card. The one or more third communication links 150 are also electrical links. On the other hand, the one or more second communication links 160 are optical links.

The one or more first and third communication links 150, 170 are point-to-point links, in that they respectively link the first framer device 110 and the first optical module 120, and the second optical module 130 and the second framer device 140. The one or more second communication links 160 may also be point-to-point links.

The interfaces between the first framer device 110 and the first optical module 120, and between the second optical module 130 and the second framer device 140 may be known as attachment unit interfaces (AUIs) or module-framer interfaces (MFIs).

Figure 2:
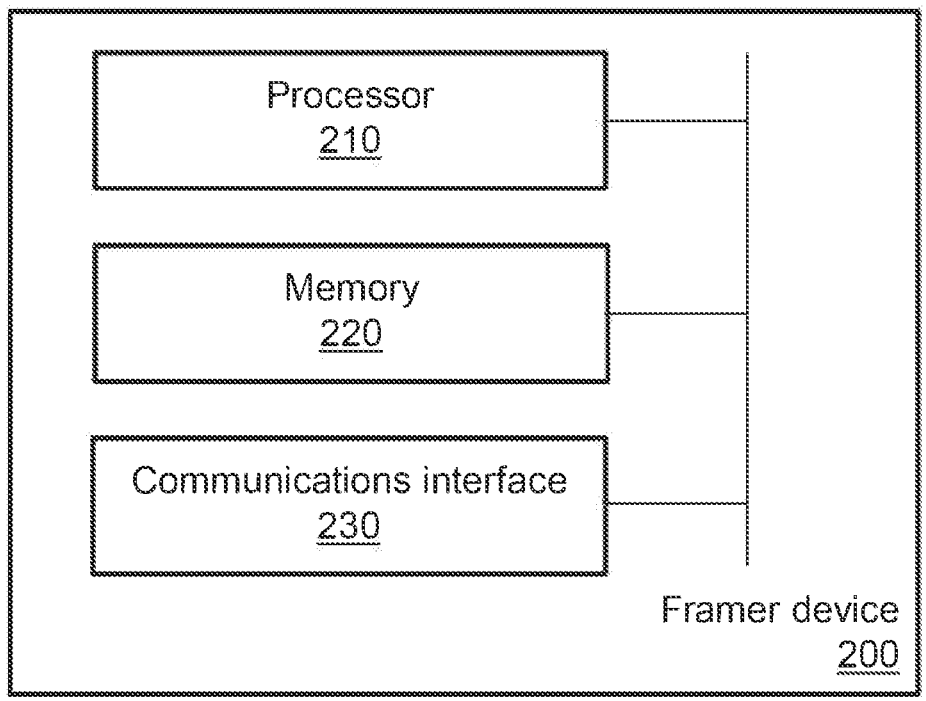
FIG. 2 is a block diagram of an example of a framer device for use with the methods described herein.

FIG. 2 is a block diagram of an example of a framer device 200 for use with the methods described herein, such as the first framer device 110 or the second framer device 140.

The framer device 200 comprises a processor 210 arranged to execute computer-readable instructions as may be provided to the framer device 200 via one or more of a memory 220, or a communications interface 230. The memory 220, for example a random access memory (RAM), is arranged to be able to retrieve, store, and provide to the processor 210, instructions and data that have been stored in the memory 220. The communications interface 230 is arranged to enable the processor 210 to communicate with a communications network, such as the Internet. The communications interface 230 may allow the framer device 200 to communicate with both a host system and an optical module 300. The framer device 200 may be implemented as an Application-Specific Integrated Circuit (ASIC).

Figure 3:
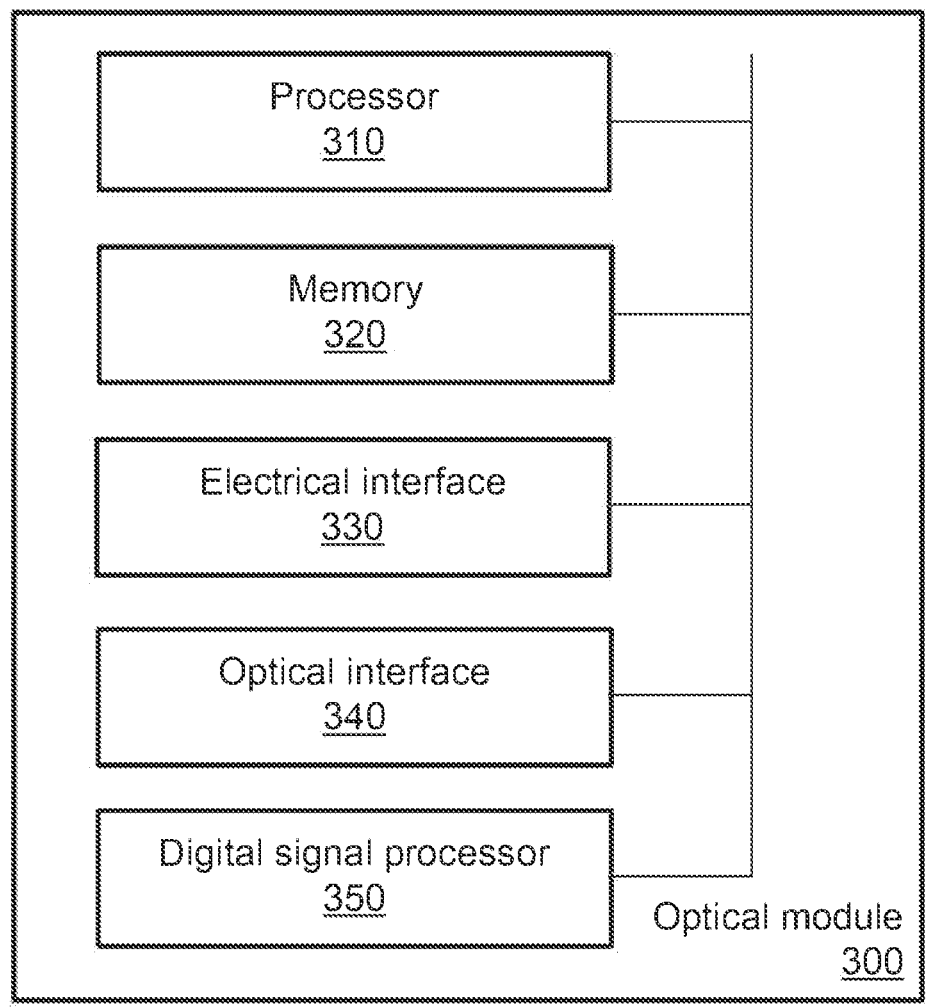
FIG. 3 is a block diagram of an example of an optical module for use with the methods described herein.

FIG. 3 is a block diagram of an example of an optical module 300 for use with the methods described herein, such as the first optical module 120 or the second optical module 130.

The optical module 300 comprises a processor 310 arranged to execute computer-readable instructions as may be provided to the optical module 300 via one or more of a memory 320, or a communications interface such as electrical interface 330 and/or optical interface 340. The memory 320, for example a random access memory (RAM), is arranged to be able to retrieve, store, and provide to the processor 310, instructions and data that have been stored in the memory 320. The optical module 300 comprises an electrical interface 330 arranged to enable the processor 310 to communicate with another device (such as a framer device 200) via an electrical link (such as the one or more first communication links 150 or the one or more third communication links 170). The optical interface 340 is arranged to enable the processor 210 to communicate with another device (such as another optical module 300) via an optical link (such as the one or more second communication links 160). The optical module 300 may further comprise a digital signal processor (DSP) 350 arranged to perform digital signal processing operations such as sampling or filtering.

During the transmission of data over the one or more second communication links 160, errors may be introduced. On the other hand, the one or more first and third communication links 150, 170 are typically assumed to be error-free. However, the inventors have recognised that, when these links are lengthy (e.g., the backplane traces are lengthy) and/or data is transmitted at very high data rates and/or data is transmitted using complex modulation schemes, errors may still occur.

If FEC is used to protect the data transmitted over the one or more first, second and third communication links 150, 160, 170, errors may be detected and the performance of the first, second and third communication links 150, 160, 170 may be monitored by decoding FEC bits inserted, for example, by the first framer device 110, into the data to be transmitted. However, such decoding may be computationally complex.

Figure 4A:
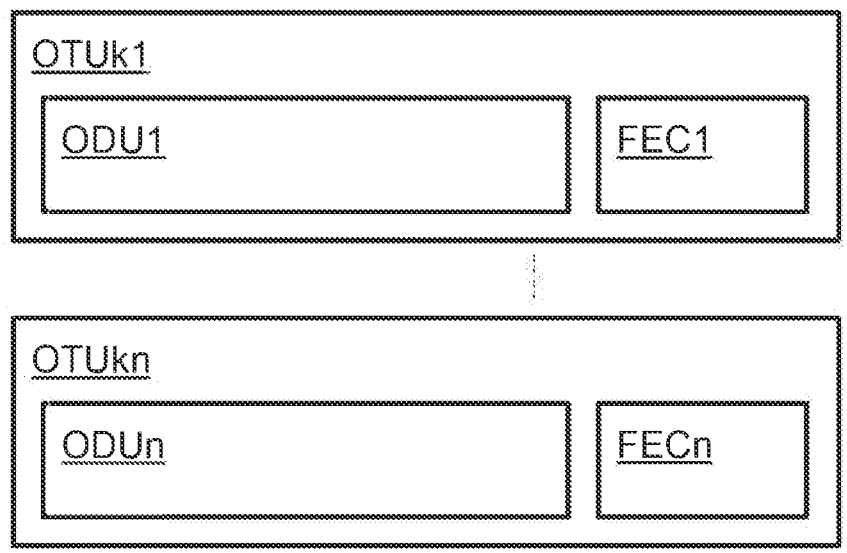
FIG. 4A is a diagram of a series of optical transport unit frames received by a framer device.

FIG. 4A is a diagram of a series of optical transport unit (OTU) frames OTUk1 . . . OTUkn received by framer device 110, where k denotes a data rate (possible values of k include k=1, 2, 2e, 2f, 3, 3e2, or 4, where, for example, k=1 corresponds to an approximate data rate of 2.66 Gbits/s). Each OTU frame OTUk1 . . . OTUkn comprises an optical data unit (ODU) frame (or 'subframe') ODU1 . . . ODUn, and a sequence of forward error correction, FEC, bits FEC1 . . . FECn for the corresponding ODU frame ODU1 . . . ODUn. It will be understood that the term 'receiving' need not necessarily indicate that data is received from another device; for example, the OTU frames may be received by another part of the framer device 110, such as a module arranged to add the FEC bits FEC1 . . . FECn.

Figure 4B:
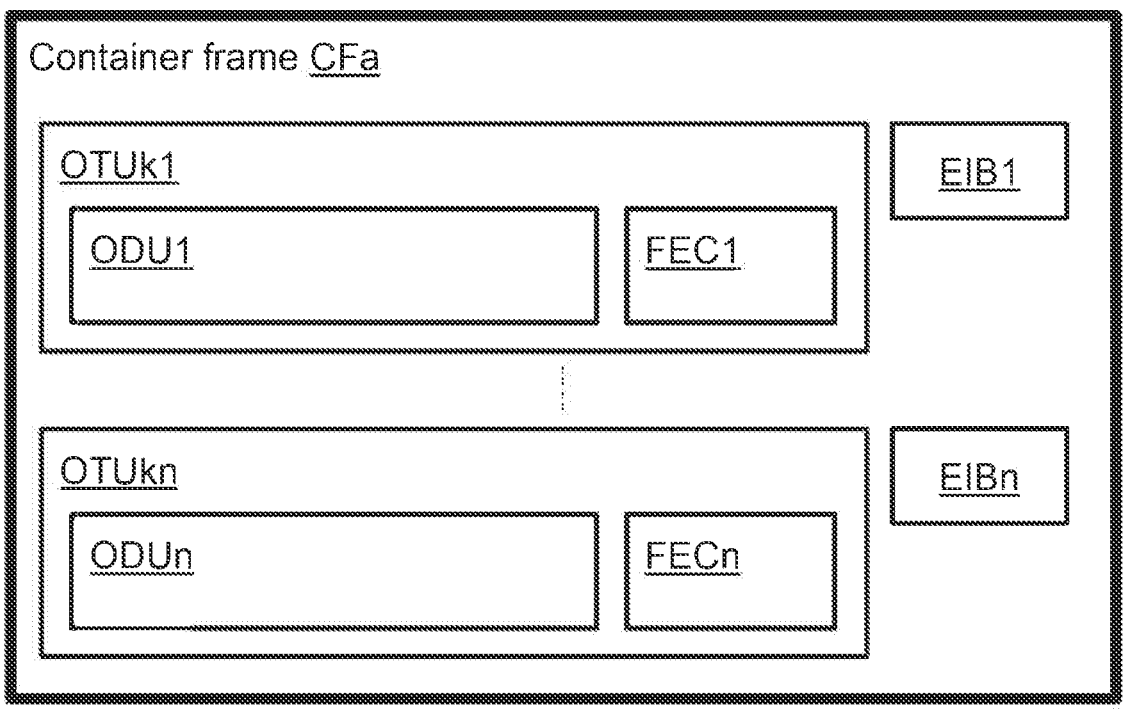
FIG. 4B is a diagram of a container frame transmitted by an optical module.

In order to transmit the OTU frames OTUk1 . . . OTUkn to the first optical module 120, the first framer device 110 forms a container frame CFa, as shown in FIG. 4B. The container frame CFa has a payload which comprises a plurality of the OTU frames OTUk1 . . . OTUkn. If the length of the payload is not a multiple of the length of each of the OTU frames, a portion of the payload is unused. For example, if the payload has a standardised length of 82,110 bits, while each OTU frame has a length of 16,384 bits, 5 of such frames can be carried in the container frame CFa, leaving 82,110−5*16,384=190 unused bits. Such unused bits may also be referred to as 'spare', 'vacant', 'stuffing' or 'padding' bits.

These bits can be used to carry sequences of error-identifying bits EIB1 . . . EIBn for the OTU frames OTUk1 . . . OTUkn. These error-identifying bits allow errors in the transmission of the OTU frames OTUk1 . . . OTUkn to be detected, but not necessarily corrected. Detection of transmission errors from the error-identifying bits may be performed at low computational cost, particularly in comparison to the decoding of the sequences of FEC bits.

The error-identifying bits may, for example, be parity bits, such as bit interleaved parity (BIP) bits. In this case, errors can be detected by performing simple exclusive-OR (XOR) operations on the data bits upon which a parity bits is based: if the results match the BIP bits, no errors have occurred, but if the results do not match, at least one error has occurred.

The BIP bits may be BIP-8 bits, i.e., each sequences of BIP bits may be 8 bits (or one byte) long.

Figure 4C:
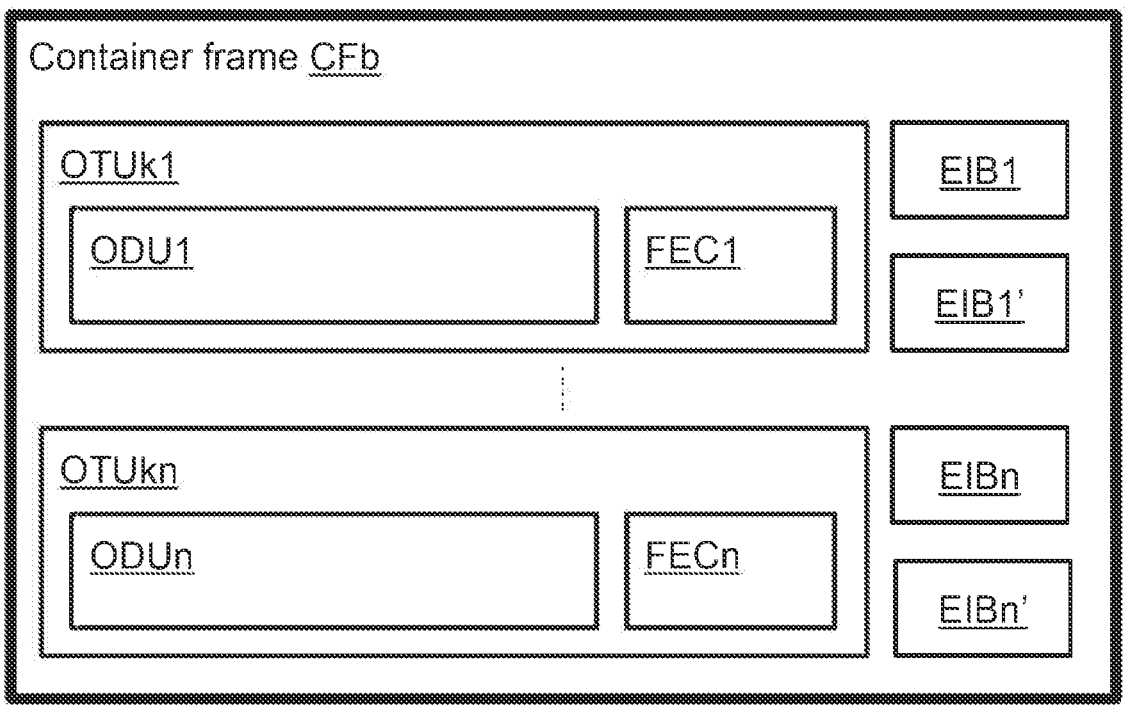
FIG. 4C is a diagram of another container frame transmitted by another optical module.

If, after inserting error-identifying bits EIB1 EIBn into the container frame CFa, bits in the container frame CFa remain unused, a device which subsequently receives the container frame CFa, such as the second optical module 130, can add additional sequences of error-identifying bits EIB1' . . . EIBn', as shown in FIG. 4C. In this case, the first sequences of error-identifying bits EIB1 . . . EIBn enable monitoring of a first communication link (e.g., the one or more first communication links 150), while the second sequences of error-identifying bits EIB1' . . . EIBn' enable monitoring of another communication link (e.g., the one or more third communication links 170).

Thus, when data is transmitted over successive communication links, the contribution of each of those links to data transmission errors can be determined: the aggregate link between the first framer device 110 and the second framer device 140 is partitioned. In other words, the performance of a communication system or path between two network nodes can be determined link-by-link, rather than end-to-end.

Figure 5:
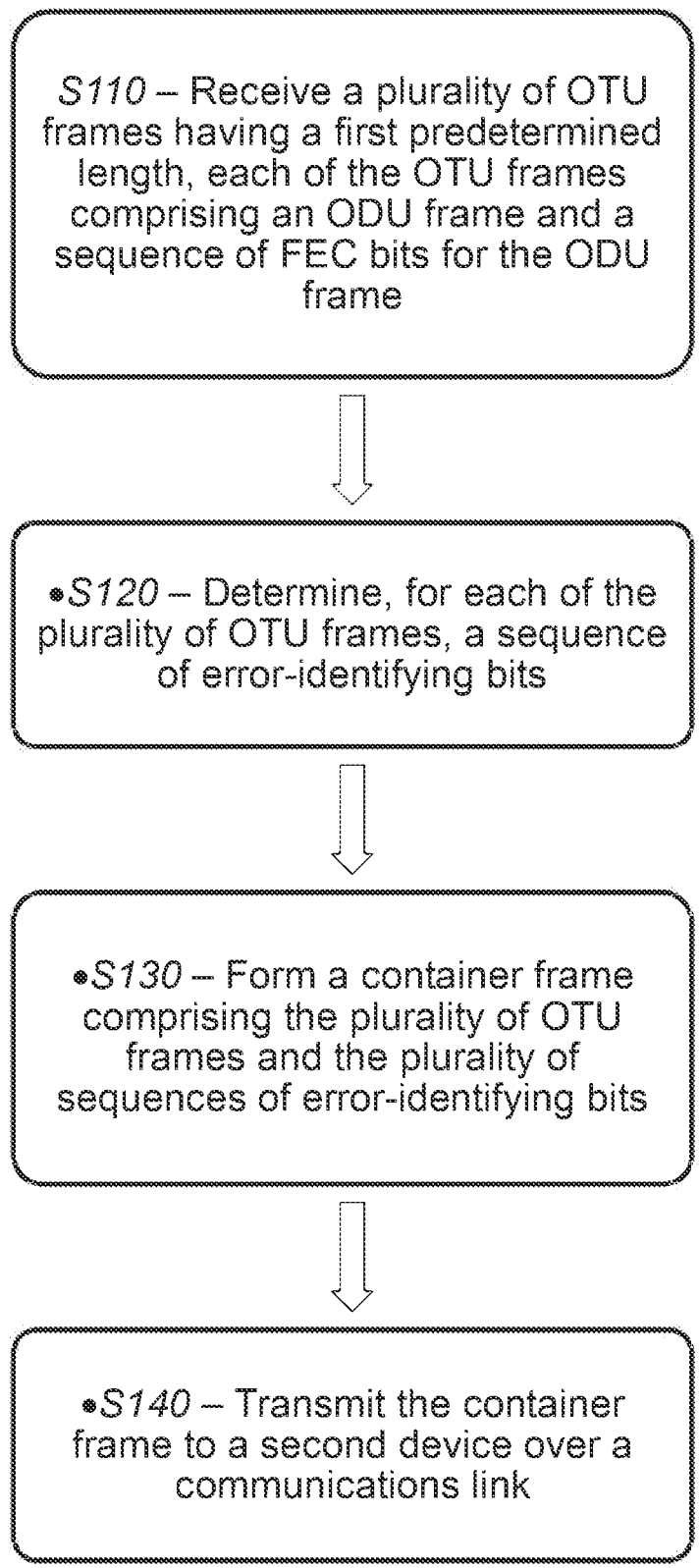
FIG. 5 is a flowchart illustrating steps of a first method described herein for use with a first framer device.

FIG. 5 is a flowchart illustrating steps of a first method described herein for use with a first device, such as framer device 110.

In step S110, a plurality of OTU frames OTUk1 . . . OTUkn each having a first length are received, each of the OTU frames comprising an ODU frame ODU1 . . . ODUn (or 'subframe') and a sequence FEC1 . . . FECn of FEC bits for the ODU frame. The FEC bits FEC1 . . . FECn may have been previously computed by the first device itself, or by a device upstream from the first device.

In step S120, for each of the plurality of OTU frames OTUk1 . . . OTUkn, a sequence EIB1 . . . EIBn of error-identifying bits is determined. The error-identifying bits may be BIP bits.

In step S130, a container frame CFa is formed. The container frame CFa has a payload comprising the plurality of OTU frames OTUk1 . . . OTUkn and the plurality of sequences EIB1 . . . EIBn of error-identifying bits.

The payload of the container frame CFa has a second length, which is not a multiple of the first length. The first and/or second lengths may be predetermined or standardised lengths. For example, the first and/or second lengths may be predetermined according to ITU-T Recommendation G.709.3, as discussed below.

In step S140, the container frame is transmitted to a second device, such as the first optical module 120, over a communications link, such as the one or more first communication links 150.

FIG. 6 is a flowchart illustrating steps of a second method described herein for use with a second device, such as first optical module 120.

In step S210, a container frame CFa is received over a communications link. The container frame has a payload comprising: a plurality of OTU frames OTUk1 . . . OTUkn each comprising an ODU frame (or 'subframe') ODU1 . . . ODUn and a sequence FEC1 . . . FECn of FEC bits for the ODU frame ODU1 . . . ODUn; and a plurality of sequences of error-identifying bits EIB1 . . . EIBn, each sequence being for a respective one of the OTU frames OTUk1 . . . OTUkn. The container frame CFa may be received from the first framer device 110, and may be received over the one or more first communication links 150.

The payload of the container frame CFa has a first length and the OTU frames OTUk1 OTUkn each have a second length. The first length is not a multiple of the second length. The first and/or second lengths may be predetermined or standardised lengths as explained above.

In step S220, based on the plurality of sequences EIB1 . . . EIBn of error-identifying bits, a performance of the communications link is determined. For example, the error-identifying bits may be recomputed, and may be compared to the error-identifying bits EIB1 . . . EIBn in the container frame CFa. If they do not match, this may indicate that errors have occurred; conversely, if they do match, this may indicate that errors have not occurred. Based on the number of (mis)matches, the performance of the communications link may be determined.

The second device may, conditional upon the determining of step S220 indicating that no transmission errors have occurred, determine not to decode the FEC bits FEC1 . . . FECn, as there are no errors to be corrected.

In step S230, the container frame may be transmitted to a third device, such as the second optical module 130. The transmitting may be over the one or more second communication links 160.

FIG. 7 is a flowchart illustrating steps of a third method described herein for use with a third device, such as second optical module 130.

In step S310, a first container frame (e.g., container frame CFa) is received over a communications link. The container frame has a payload comprising: a plurality of OTU frames OTUk1 . . . OTUkn, each comprising an ODU frame (or subframe') ODU1 . . . ODUn and a sequence FEC1 . . . FECn of FEC bits for the ODU frame ODU1 . . . ODUn; and a plurality of first sequences EIB1 . . . EIBn of error-identifying bits, each first sequence being for a respective one of the OTU frames. The container frame may be received from the first optical module 120, and may be received via the one or more second communication links 160.

The payload of the container frame CFa has a first length and the OTU frames OTUk1 . . . OTUkn each have a second length. The first length is not a multiple of the second length. The first and/or second lengths may be predetermined or standardised lengths as explained above.

The FEC bits of step S310 may or may not be the same as those of steps S210 and S110. Indeed, in a distributed FEC scenario, a first FEC encoding step may be performed in the first device of FIG. 5, and a second FEC encoding step may be performed in the second device of FIG. 6.

In step S320, for each of the plurality of OTU frames OTUk1 . . . OTUkn, a second sequence EIB1' . . . EIBn' of error-identifying bits is determined.

In step S330, a second container frame CFb is formed. The second container frame CFb comprises the plurality of OTU frames OTUk1 . . . OTUkn, the plurality of first sequences EIB1 . . . EIBn of error-identifying bits, and the plurality of second sequences EIB1' . . . EIBn' of error-identifying bits.

In step S340, based on the plurality of first sequences EIB1 . . . EIBn of error-identifying bits, a performance of the communications link is determined. As in step S220, the performance may be determined by recomputing the error-identifying bits and checking them against those in the received first container frame.

The third device may, conditional upon the determining of step S340 indicating that no transmission errors have occurred, determine not to decode the FEC bits FEC1 . . . FECn, as no errors need correcting.

In step S350, the second container frame CFb is transmitted to a fourth device, such as second framer device 140. The transmitting may be over the one or more third communication links 170.

FIG. 8 is a flowchart illustrating steps of a fourth method described herein for use with a fourth device, such as second framer device 140.

In step S410, a container frame (such as container frame CFb) is received over a communications link. The container frame has a payload comprising: a plurality of OTU frames OTUk1 . . . OTUkn each comprising an ODU frame (or 'subframe') ODU1 . . . ODUn and a sequence FEC1 . . . FECn of FEC bits for the ODU frame ODU1 . . . ODUn; a plurality of first sequences EIB1 . . . EIBn of error-identifying bits, each of the first sequences being for a respective one of the OTU frames OTUk1 . . . OTUkn; and a plurality of second sequences EIB1' . . . EIBn' of error-identifying bits, each of the second sequences being for a respective one of the OTU frames OTUk1 . . . OTUkn.

The payload of the container frame has a first length and the OTU frames OTUk1 . . . OTUkn each have a second length. The first length is not a multiple of the second length. The first and/or second lengths may be predetermined or standardised lengths as explained above.

In step S420, based on the plurality of first sequences EIB1 . . . EIBn of error-identifying bits, a performance of the communications link is determined. As in step S220, the performance may be determined by recomputing the error-identifying bits and checking them against those in the container frame received in step S410.

In step S430, based on the plurality of second sequences EIB1' . . . EIBn' of error-identifying bits, a performance of a second communications link over which the container frame has travelled (such as the one or more third communication links 170) is determined. As in step S420, the performance may be determined by recomputing the error-identifying bits EIB1' . . . EIBn' and checking them against those in the container frame received in step S410.

In step S440, the sequences FEC1 . . . FECn of FEC bits are decoded. Based on the decoding, errors in the OTU frames OTUk1 . . . OTUkn may be corrected, if necessary.

The fourth device may, conditional upon the determining of step S420 indicating that no transmission errors have occurred, determine that the execution of step S440 is not required, as there are no errors to correct, and may then determine not to perform this step.

In step S450, based on the decoding, a performance of an aggregated communications link over which the container frame has travelled may be determined, the aggregated communications link comprising the first and second communications links and a third communications link. The first communications link may be the one or more first communication links 150, the second communications link may be the one or more third communication links 170, and the third communications link may be the one or more second communication links 160. In other words, the aggregated communications link may comprise the electrical links 150 and 170 (errors on which are respectively identified using the error-identifying bits EIB1 . . . EIBn and EIB1' . . . EIB'n) as well as the optical links 160.

The methods described herein can be applied to International Telecommunication Union (ITU)-T Recommendation G.709.3, also known as G.709.flexo-lr, FlexO-LR (FlexO-Long Reach), or FlexO-SC (FlexO-Staircase). In this case, the container frames CFa and CFb are referred to as FlexO frames, and the FEC is performed with staircase codes (SC); in other words, staircase FEC is used.

According to G.709.3, there are 38 stuffing bits per FlexO frame. Six of these 38 bits have already been used for a Multiblock Alignment Signal (MBAS). This, however, leaves 32 bits, which can be used for other purposes. In one example, these 32 bits are allocated as follows:

[9:0] BIP-A (BIP sequence for the one or more first communication links 150, i.e., near-end BIP)

[19:10] BIP-B (BIP sequence for the one or more third communication links 170, i.e., far-end BIP)

[29:20] RES (used to transport backward information)

[31:30] unused

[37:32] MBAS

It will of course be understood that these bits may be allocated differently, e.g., the various sequences could be placed in different positions.

The error-identifying bits EIB1 . . . EIBn and EIB1' . . . EIBn' are inserted after FEC encoding has been performed, and are extracted before FEC decoding is performed. As, according to G.709.3, the padding or unused bits are assumed to be zeros by the FEC encoder (all-zero value scrambled by the FlexO frame scrambler), the error-identifying bits do not affect the FEC encoding and decoding processes.

Figure 9:
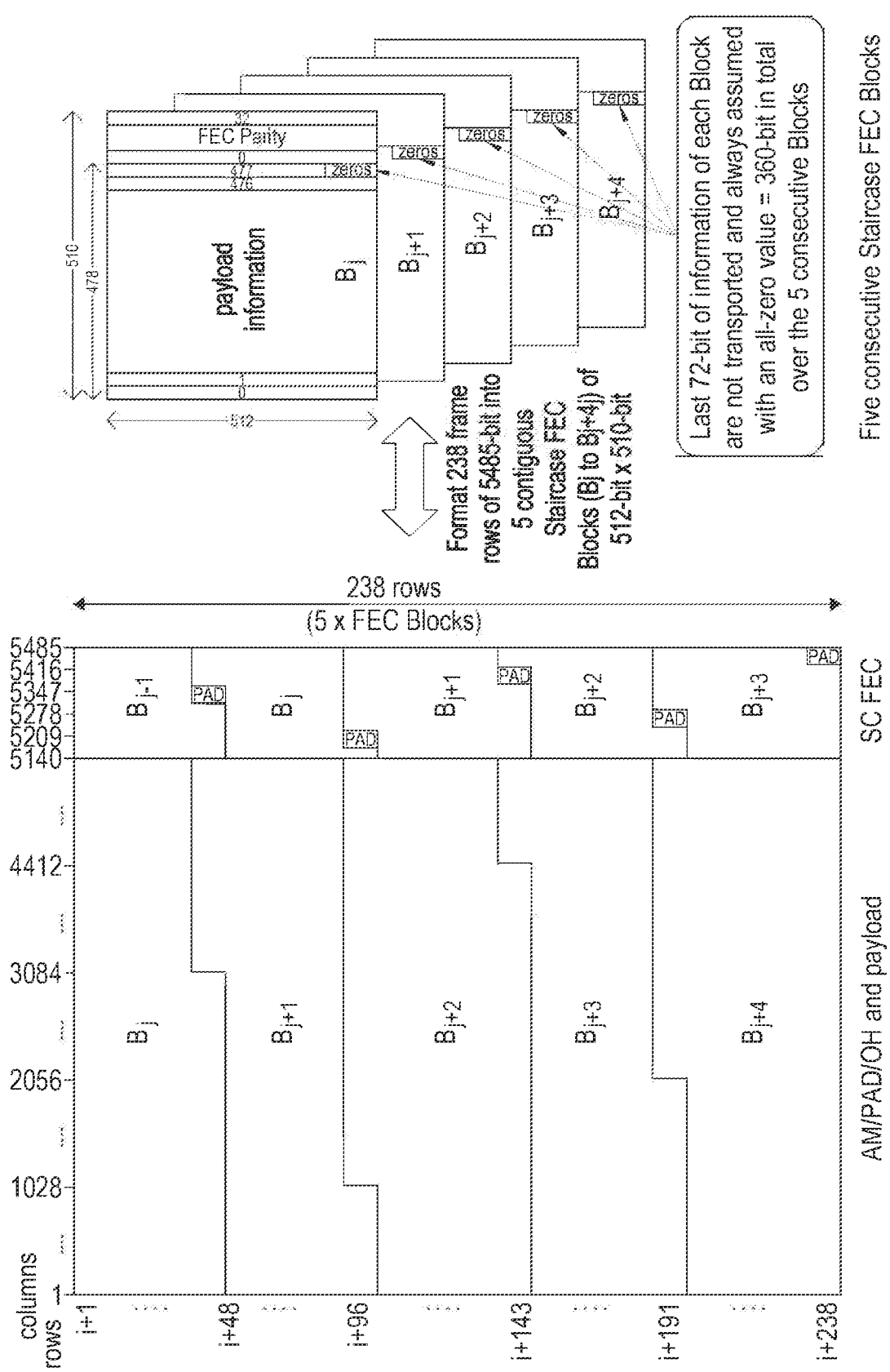
FIGS. 9, 10A and 10B are diagrams illustrating the use of the methods described herein in a G.709.3 system.

FIG. 9 illustrates a container frame (a FlexO, FlexO-SC, or FlexO-LR frame) in a G.709.3 context. Staircase FEC uses a frame structure based on 512 rows and 510 columns, where 32 bits of each row are reserved or allocated for FEC bits. This frame structure is not optimised for use with FlexO frames, and needs to be mapped over to a FlexO frame having 238 rows and 5485 columns. In the FlexO frame, 5140 bits of each row (e.g., bits 1 to 5140) are reserved or allocated for a payload, and 385 bits (e.g., bits 5141 to 5485) are reserved or allocated for FEC bits corresponding to the payload. In total, 82110 (238 times 345) bits are therefore reserved for FEC bits.

Each FlexO frame can contain five staircase FEC frames. More specifically, the bits of an SC FEC block structure (consisting of 238 consecutive 100G FlexO-LR frame rows of 5140+345 bits) map into five (8×30592 bit information+ 8×2048 bit parity) base blocks (Staircase). Such a FlexO frame then contains 81920 FEC bits (5 times 32 times 512), while 82110 bits have been reserved for FEC bits. This leaves 190 padding bits (82110 minus 81920) or 38 bits per staircase FEC frame, some of which, in the present disclosure, are used to carry error-determining bits.

Figure 10A:
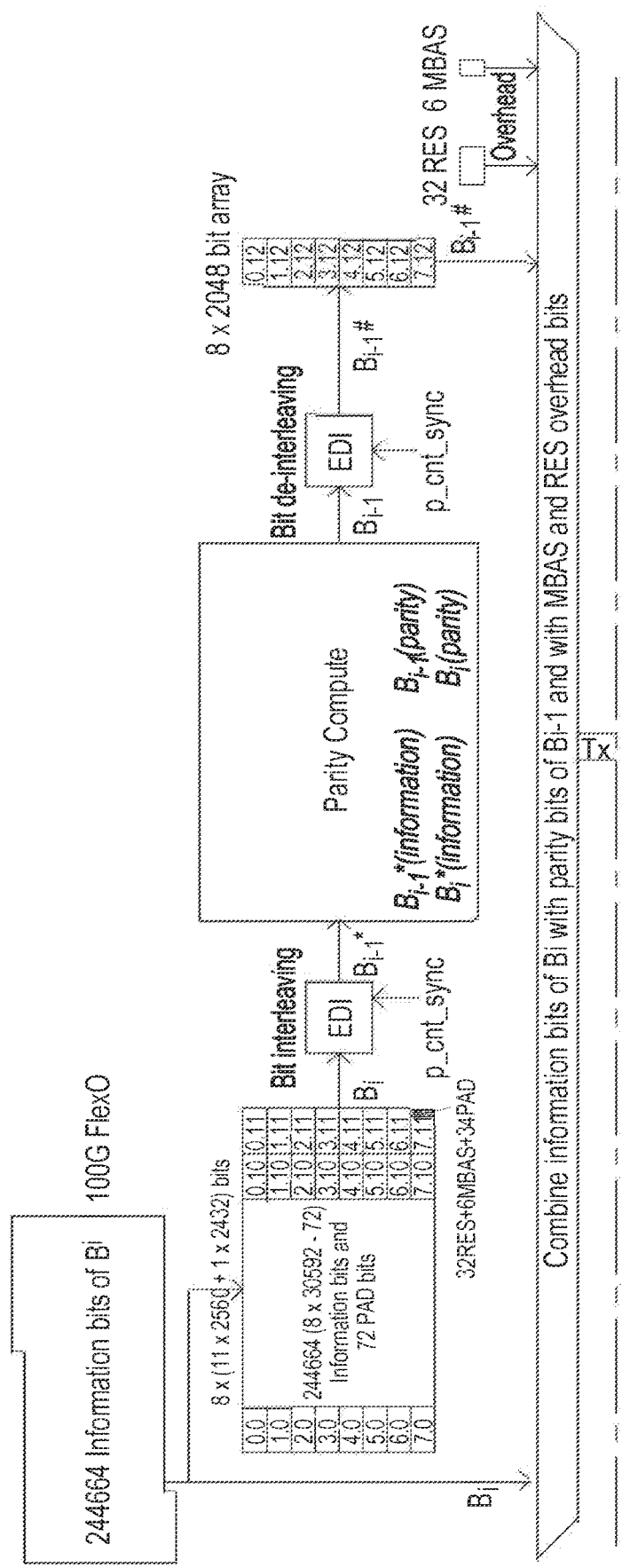
Figure 10B:
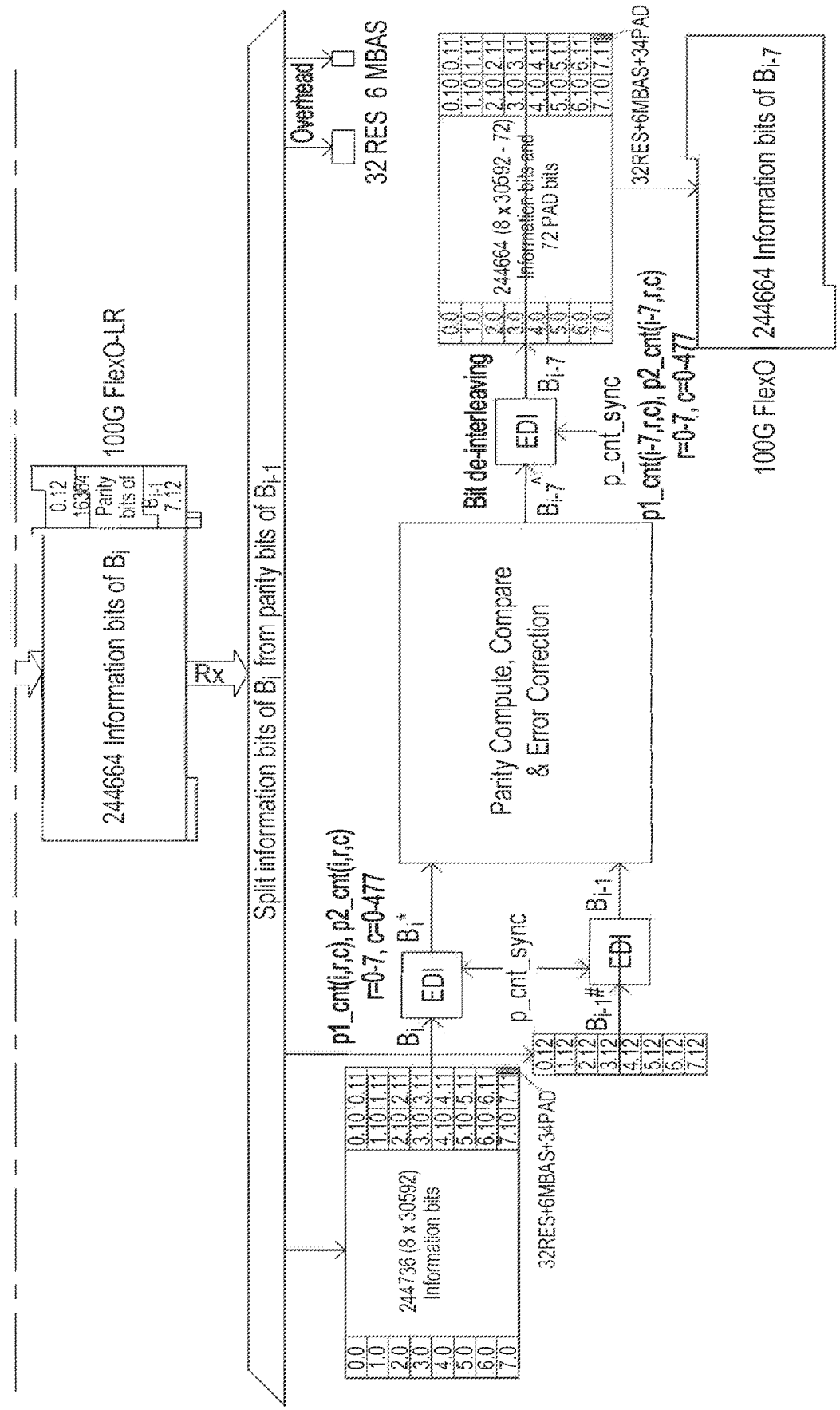

FIGS. 10A and 10B illustrate the insertion of the above 38 bits into the FlexO frame defined by G.709.3. It can be seen that these bits are inserted after the FEC parity calculation, and extracted before any other operation.

The methods described herein may be particularly useful in a distributed FEC scenario where FEC encoding and decoding is distributed across the framer devices and optical modules, rather than FEC encoding and decoding being performed successively in each of the devices of FIG. 1 (i.e., separate sequences of FEC bits protecting each of the communication links 150, 160, 170).

As will be understood by a person skilled in the art, the methods described herein (and, in particular, the methods described in FIGS. 5 to 8) do not require all of the listed steps to be performed. As one example, steps S220, S340, S420, and S430 may not be performed if it is not desired to monitor the performance of a particular link at a particular device. As another example, steps S140, S230, S350 could be omitted, depending on where the device performing the method is positioned in a transmission chain.

Furthermore, the steps of the methods described herein (and, in particular, the methods described in FIGS. 5 to 8)

need not be performed in the listed order. As one example, step S340 could be performed prior to the forming of a second container frame in step S330.

For ease of explanation, the steps of FIGS. 5 to 8 have been indicated as being performed sequentially. However, as a person skilled in the art would understand, these steps may be performed continuously, in parallel and/or in real-time.

It will be understood that, in the present disclosure, a reference to a communication link may, in some examples, be a reference to either a physical communication link or a logical communication link. A logical communication link may then correspond to multiple physical communication links—e.g., the framer device 110 and optical module 120 may be connected by a bus. Thus, when a frame is said to be transmitted over a link from one device to another device, it is understood that it may be transmitted over multiple physical communication links connecting the one device to the other device. Similarly, when a frame is said to be received over a communication link at one device from another device, it is understood that it may be transmitted over multiple physical communication links connecting the one device to the other device.

It will be understood that, while the present disclosure sets out a scenario in which two sets of sequences of error-identifying bits (EIB1 . . . EIBn and EIB1' . . . EIBn') are determined and transmitted, the present disclosure could be extended to any number of sets of such sequences, depending on how it is desired to partition a path between two devices.

Although the BIP bits may be BIP-8 bits, i.e., each sequences of BIP bits may be 8 bits (or one byte) long, it will be recognised that any BIP sequence length (e.g., BIP-10) may be used.

It will be understood that the error-identifying bits need not be BIP bits, e.g., they may be other types of parity bits that enable a bit error rate to be monitored.

It will be understood that the methods described herein need not be used with staircase FEC, and may be used with other FEC codes, since the error-identifying bits do not affect the FEC encoding/decoding.

An effect of the present disclosure is the provision of a method of monitoring the performance of a communications link between a framer device and an optical module.

An effect of the present disclosure is to enable such monitoring at low computational cost and without associated traffic overhead.

An effect of the present disclosure is a method of monitoring the performance of a communications link without requiring FEC bits to be decoded (in other words, without requiring FEC termination). The decoding of FEC bits may be particularly computationally complex when strong FEC codes—which are particularly suited to data transmission at high rates—are used.

An effect of the present disclosure is to enable the performance of a communications link between a framer device and an optical module to be monitored without requiring FEC decoding hardware in the optical module and without introducing latency. An effect of the present disclosure is thus to reduce the power consumption of the optical module.

An effect of the present disclosure is to move the FEC encoding/decoding complexity from the optical module to the framer device, which may have less stringent power consumption constraints due to its larger size.

An effect of the present disclosure is to allow the performance of a series of communication links to be individually monitored, without requiring FEC en/decoding at the beginning and end of each link.

An effect of the present disclosure is to facilitate the diagnosis of performance problems in optical communication systems. For example, the fact that an optical module that is not properly plugged in may be detected, rather than simply the fact that there are transmission problems somewhere between the first and second framer devices 110 and 140, respectively.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer-readable media or, more generally, a computer program product. The computer-readable media may be transitory or non-transitory. The one or more computer-readable media could be, for example, an electronic, magnetic, optical, electromagnetic, infrared, or semiconductor system, or a propagation medium for data transmission, for example for downloading the code over the Internet. Alternatively, the one or more computer-readable media could take the form of one or more physical computer-readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

There is described a computer-readable medium comprising computer-readable instructions which, when executed by a processor, cause the processor to perform any of the methods described herein. The computer-readable medium may be a tangible and/or non-transitory medium.

In one form, a method of error control is provided, that comprises: receiving at a first device, over a first communications link, a container frame having a payload of a first length, the payload comprising: a plurality of optical transport unit (OTU) frames having a second length, each OTU frame comprising: an optical data unit (ODU) frame, and a sequence of forward error correction (FEC) bits for the ODU frame; and a plurality of sequences of error-identifying bits, each sequence being for a respective one of the OTU frames, wherein the first length is not a multiple of the second length; and determining, based on the plurality of sequences of error-identifying bits, a performance of the first communications link.

In another form, an apparatus is provided, comprising: a memory; a communications interface configured to receive, over a first communications link, a container frame having a payload of a first length, the payload comprising: a plurality of optical transport unit (OTU) frames having a second length, each OTU frame comprising: an optical data unit (ODU) frame, and a sequence of forward error correction (FEC) bits for the ODU frame; and a plurality of sequences of error-identifying bits, each sequence being for a respective one of the OTU frames, wherein the first length is not a multiple of the second length; and a processor configured to determine, based on the plurality of sequences of error-identifying bits, a performance of the first communications link.

An apparatus arranged to perform any of the methods described herein is provided. A framer device arranged to perform any of the methods described herein is provided. An optical module arranged to perform any of the methods described herein is provided. The apparatus, framer device or optical module may comprise a processor arranged to perform any of the methods described herein. The apparatus, framer device or optical module may comprise means for performing any of the steps of the methods described herein.

In still another form, one or more non-transitory computer-readable media are provided, comprising computer-readable instructions which, when executed by a processor of a first device, cause the processor to: receive, over a first communications link, a container frame having a payload of a first length, the payload comprising: a plurality of optical transport unit (OTU) frames having a second length, each OTU frame comprising: an optical data unit (ODU) frame, and a sequence of forward error correction (FEC) bits for the ODU frame; and a plurality of sequences of error-identifying bits, each sequence being for a respective one of the OTU frames, wherein the first length is not a multiple of the second length; and determine, based on the plurality of sequences of error-identifying bits, a performance of the first communications link.

Those skilled in the art will recognise that a wide variety of modifications, alterations, and combinations can be made with respect to the above described examples without departing from the scope of the disclosed concepts, and that such modifications, alterations, and combinations are to be viewed as being within the ambit of the disclosed concepts.

Those skilled in the art will also recognise that the scope of the embodiments presented herein is not limited by the examples described herein, but is instead defined by the appended claims.

What is claimed is:

1. A method of error control comprising:
   receiving at a first device, a first container frame having a payload of a first length, the payload comprising:
   a plurality of optical transport unit (OTU) frames having a second length, each OTU frame comprising:
   an optical data unit (ODU) frame, and
   a sequence of forward error correction (FEC) bits for the ODU frame; and
   a plurality of first sequences of error-identifying bits associated with the plurality of OTU frames;
   determining, for each of the plurality of OTU frames, a second sequence of error-identifying bits to generate a plurality of second sequences of error-identifying bits;
   forming a second container frame comprising the plurality of OTU frames, the plurality of first sequences of error-identifying bits, and the plurality of second sequences of error-identifying bits; and
   transmitting the second container frame to a second device.

2. The method of claim 1, further comprising:
   decoding the sequences of FEC bits; and
   determining, based on the decoding, a performance of an aggregated communications link over which the first container frame has travelled.

3. The method of claim 1, further comprising determining, based on the plurality of first sequences of error-identifying bits, a performance of a first communications link.

4. The method of claim 3, wherein the performance of the first communications link is determined without decoding the sequences of FEC bits.

5. The method of claim 3, wherein the first communications link is a point-to-point link.

6. The method of claim 1, wherein the sequences of FEC bits are encoded according to a staircase FEC code.

7. The method of claim 1, wherein the plurality of first sequences of error-identifying bits are associated with a first communications link in an aggregated communications link over which the first container frame has travelled, and wherein the plurality of second sequences of error-identifying bits are associated with a second communications link in the aggregated communications link.

8. An apparatus comprising:
   a memory;
   a communications interface configured to receive a first container frame having a payload of a first length, the payload comprising:
   a plurality of optical transport unit (OTU) frames having a second length, each OTU frame comprising:
   an optical data unit (ODU) frame, and
   a sequence of forward error correction (FEC) bits for the ODU frame; and
   a plurality of first sequences of error-identifying bits, each first sequence being for a respective one of the OTU frames; and
   a processor configured to:
   determine, for each of the plurality of OTU frames, a second sequence of error-identifying bits to generate a plurality of second sequences of error-identifying bits;
   form a second container frame comprising the plurality of OTU frames, the plurality of first sequences of error-identifying bits, and the plurality of second sequences of error-identifying bits; and
   cause the communications interface to transmit the second container frame to a second device.

9. The apparatus of claim 8, wherein the processor is further configured to:
   decode the sequences of FEC bits; and
   determine, based on the decoding, a performance of an aggregated communications link over which the first container frame has travelled.

10. The apparatus of claim 8, wherein the processor is further configured to determine, based on the plurality of first sequences of error-identifying bits, a performance of a first communications link.

11. The apparatus of claim 10, wherein the processor is configured to determine the performance of the first communications link without decoding the sequences of FEC bits.

12. The apparatus of claim 10, wherein the first communications link is a point-to-point link.

13. The apparatus of claim 8, wherein the sequences of FEC bits are encoded according to a staircase FEC code.

14. The apparatus of claim 8, wherein the plurality of first sequences of error-identifying bits are associated with a first communications link in an aggregated communications link over which the first container frame has travelled, and wherein the plurality of second sequences of error-identifying bits are associated with a second communications link in the aggregated communications link.

15. One or more non-transitory computer-readable media comprising computer-readable instructions which, when executed by a processor of a first device, cause the processor to:
  receive a first container frame having a payload of a first length, the payload comprising:
    a plurality of optical transport unit (OTU) frames having a second length, each OTU frame comprising:
      an optical data unit (ODU) frame, and
      a sequence of forward error correction (FEC) bits for the ODU frame; and
    a plurality of first sequences of error-identifying bits associated with the plurality of OTU frames;
  determine, for each of the plurality of OTU frames, a second sequence of error-identifying bits to generate a plurality of second sequences of error-identifying bits;
  form a second container frame comprising the plurality of OTU frames, the plurality of first sequences of error-identifying bits, and the plurality of second sequences of error-identifying bits; and
  transmit the second container frame to a second device.

16. The non-transitory computer-readable media of claim 15, further comprising computer-readable instruction that cause the processor to:
  decode the sequences of FEC bits; and
  determine based on the decoding, a performance of an aggregated communications link over which the first container frame has travelled.

17. The non-transitory computer-readable media of claim 15, further comprising computer-readable instruction that cause the processor to determine, based on the plurality of first sequences of error-identifying bits, a performance of a first communications link.

18. The non-transitory computer-readable media of claim 17, further comprising computer-readable instruction that cause the processor to determine the performance of the first communications link without decoding the sequences of FEC bits.

19. The non-transitory computer-readable media of claim 15, wherein the sequences of FEC bits are encoded according to a staircase FEC code.

20. The non-transitory computer-readable media of claim 15, wherein the plurality of first sequences of error-identifying bits are associated with a first communications link in an aggregated communications link over which the first container frame has travelled, and wherein the plurality of second sequences of error-identifying bits are associated with a second communications link in the aggregated communications link.

* * * * *